United States Patent
Anderson et al.

(10) Patent No.: US 9,484,977 B2
(45) Date of Patent: Nov. 1, 2016

(54) RF TRANSFORMER BASED TX/RX INTEGRATED RF SWITCH

(71) Applicant: DSP Group, Ltd., Herzelia, IL (US)

(72) Inventors: Sergey Anderson, Netanya, IL (US); Sharon Betzalel, Ashkelon, IL (US)

(73) Assignee: DSP GROUP, LTD., Herzelia (IL)

( * ) Notice: Subject to any disclaimer, the term of this patent is extended or adjusted under 35 U.S.C. 154(b) by 37 days.

(21) Appl. No.: 14/277,427

(22) Filed: May 14, 2014

(65) Prior Publication Data

US 2015/0333791 A1    Nov. 19, 2015

(51) Int. Cl.
*H04B 1/44* (2006.01)
*H04B 1/48* (2006.01)

(52) U.S. Cl.
CPC . *H04B 1/44* (2013.01); *H04B 1/48* (2013.01)

(58) Field of Classification Search
CPC .......... H04B 1/48; H04B 1/44; H04B 1/525; H04B 1/406; H04B 1/18; H01P 1/15; H01P 1/10; H01P 1/127; H01P 5/12
USPC ....... 455/77, 78, 79, 82–84, 550.1; 333/100, 333/101, 103, 109, 112
See application file for complete search history.

(56) References Cited

U.S. PATENT DOCUMENTS

| 2004/0116082 A1* | 6/2004 | Choi ......................... H01P 5/12 455/121 |
| 2009/0137215 A1* | 5/2009 | Rofougaran .................... 455/83 |
| 2011/0068636 A1* | 3/2011 | Lee et al. ...................... 307/115 |
| 2011/0222443 A1* | 9/2011 | Khlat ............................ 370/277 |

* cited by examiner

*Primary Examiner* — Nhan Le
(74) *Attorney, Agent, or Firm* — Reches Patents (57) ABSTRACT

The present invention is a novel and useful RF transformer based transmit/receive (TX/RX) integrated RF switch. In one embodiment of the invention, the TX/RX RF switch circuit is based on the use of an RF transformer which functions as (1) the PA output transformer during TX mode and (2) as a series inductance in an LNA matching network during receive mode. Thus, the RF transformer plays a dual function or role. Antenna diversity is achieved by having multiple antennas each having an associated antenna switch connected to the output transformer. The TX/RX switch of the invention reduces the number of switches required for antenna diversity to a minimum and minimizes RF losses in the system. The TX/RX switch is suitable for use with modern wireless communication standards such as DECT, 802.11 WLAN, Bluetooth, ZigBee, etc. The configuration of the TX/RX circuit permits the use of common, relatively low cost semiconductor fabrication techniques such as standard CMOS processes.

31 Claims, 6 Drawing Sheets

RF TRANSFORMER BASED TX/RX INTEGRATED RF SWITCH

FIELD OF THE INVENTION

The present invention relates to the field of wireless radio frequency (RF) circuits, and more particularly relates to an RF transformer based transmit/receive (TX/RX) integrated RF switch.

BACKGROUND OF THE INVENTION

Currently, wireless communications systems find application in many contexts involving the transfer of information transfer from one point to another, and there exists a wide range of modalities suited to meet the particular needs of each. These systems include cellular telephones and two-way radios for distant voice communications, as well as shorter-range data networks for computer systems, among many others. Generally, wireless communications involve a radio frequency (RF) carrier signal that is modulated to represent data and the modulation, transmission, receipt and demodulation of the signal conforming to a set of standards. For wireless data networks, example standards include Wireless LAN (IEEE 802.11), Bluetooth (IEEE 802.15.1), and ZigBee (IEEE 802.15.4), which are generally time domain duplex systems where a bidirectional link is emulated on a time divided communications channel.

A fundamental component of a wireless communications system is the transceiver which includes the transmitter and receiver circuitry. The transceiver, with its digital baseband subsystem, encodes the digital data to a baseband signal and modulates the baseband signal with an RF carrier signal. The modulation utilized for WLAN includes orthogonal frequency division multiplexing (OFDM), quadrature phase shift keying (QPSK) and quadrature amplitude modulation (16 QAM, 64 QAM); for Bluetooth includes GFSK and 4/8-DQPSK; and for Zigbee includes BPSK and OQPSK (or MSK).

Upon receipt of the signal from the antenna, the transceiver downconverts the RF signal, demodulates the baseband signal and decodes the digital data represented by the baseband signal. The antenna connected to the transceiver converts the electrical signal to electromagnetic waves, and vice versa. Depending upon the particular configuration, the transceiver may include a dedicated transmit (TX) line and a dedicated receive (RX) line or the transceiver may have a combined transmit/receive line. In the case of separate TX and RX lines, the transmit line and the receive line are typically tied to a single antenna, particularly for low-cost and/or small-size applications.

The circuitry between the transceiver and the antenna is commonly referred to as the front end module (FEM). The FEM includes an RF power amplifier (PA) which generates output transmit signals by amplifying weaker input signals in wireless devices, such as cellular telephone handsets. Many of these communication devices are configured to operate in different frequency bands for different communication systems. For example, third generation (3G) cellular communication systems, 4G cellular (LTE) systems, 802.11 WLAN systems, etc.

An additional component in the signal chain is the transmit/receive (TX/RX) switch which functions to direct the high power transmit signal to the antenna and also prevents that signal from entering the sensitive front end of the local receiver, while allowing a low-loss connection between the antenna and the receiver. The TX/RX switch may be integrated into the FEM or as a standalone component.

It is therefore desirable to have a TX/RX switch capable of directing power to the antenna and also preventing the signal from entering the receiver while providing a low loss connection between the antenna and receiver. In it also desirable to have a TX/RX switch that meets the performance requirements of modern wireless standards such as 802.11, 3G and 4G cellular systems while reducing manufacturing complexities, size and cost.

SUMMARY OF THE INVENTION

The present invention is a novel and useful RF transformer based transmit/receive (TX/RX) integrated RF switch. The output power of a power amplifier is fed to the antenna load utilizing an output transformer. The power amplifier output transformer is connected directly to the antenna without requiring any additional components in the transmit signal path such as a transistor switch or an additional resonant circuit.

Antenna diversity is achieved by having multiple antennas each having an associated antenna switch connected to the output transformer. The TX/RX switch of the invention reduces the number of switches required for antenna diversity to a minimum. In addition, it also minimizes RF losses in the system.

The TX/RX switch can be used with and meets the requirements of modern wireless communication standards such as DECT, 802.11 WLAN, Bluetooth, ZigBee, etc. The configuration of the TX/RX circuit permits the use of common, relatively low cost semiconductor fabrication techniques such as standard CMOS processes.

In one embodiment of the invention, the TX/RX RF switch circuit is based on the use of an RF transformer which functions as (1) the PA output transformer during TX mode and (2) as a series inductance in an LNA matching network during receive mode. Thus, the RF transformer plays a dual function or role. Such a TX/RX switch is suitable to be integrated into front end module (FEM) circuits, transceiver modules and other RF related modules.

The TX/RX RF switch circuit overcomes issues with (1) transmit and receive low linearity, (2) RF insertion loss, (3) PA efficiency, (4) power amplifier and LNA matching, (5) ESD protection and size limitations with exist in all TX/RX RF switches.

The TX/RX RF switch circuit based on the RF transformer is applicable to numerous wireless standards including but not limited to any standard where the transmitter and receiver operate in time division multiple access (TDMA) mode and is particularly applicable to cellular multimode multiband front end circuits (e.g., in systems that combine 2G through LTE in a single system). It is also applicable and can be used for all semiconductor processes and for discrete circuit designs which combine PA and LNA discrete circuits.

Several advantages of the TX/RX switch of the present invention include: (1) eliminating active devices from the signal path; (2) and ESD protection device (i.e. capacitor) can be added to the drain of the single switching transistor; (3) the problem of stress on active devices in series with the signal path is eliminated as the demand on the switching transistor are decreased, improving modeling of the circuit; (4) chip real estate can be saved by using the secondary of the PA output transformer for the series inductance of the LNA input matching circuit; and (5) antenna diversity is achieved using only N+1 active devices where N is the number of antennas.

An integrated TX/RX radio frequency (RF) switch comprising an output transformer having a primary coil coupled to a TX circuit, and a secondary coil having a first end coupled to an antenna, a switch operative to electrically couple a second end of the secondary coil of the output transformer to ground in accordance with a switch control signal, wherein in a TX mode of operation, the switch is on and power is transferred from the TX circuit to the antenna and wherein in a RX mode of operation, the switch is off and an RF signal from the antenna is transferred to a RX circuit coupled thereto.

An integrated TX/RX radio frequency (RF) switch comprising an output transformer having a primary coil coupled to a TX circuit and a secondary coil having a first end and a second end, a plurality of antennas, a plurality of antenna switches, each switch in series with a respective antenna and coupled to the first end of the secondary coil of the output transformer, a TX/RX switch operative to electrically couple the second end of the secondary coil of the output transformer to ground in accordance with a switch control signal, wherein in a TX mode of operation, the switch is on and power is transferred from the TX circuit to one or more of the antennas and wherein in a RX mode of operation, the switch is off and an RF signal from one or more of the antennas is transferred to an RX circuit coupled thereto.

A radio frequency (RF) front end module (FEM) comprising an RF switch coupled to one or more antennas and operative to receive and transmit RF signals in one or more frequency bands, the RF switching comprising an output transformer having a primary coil coupled to a TX circuit, and a secondary coil having a first end coupled to an antenna, a switch operative to electrically couple a second end of the secondary coil of the output transformer to ground in accordance with a switch control signal, wherein in a TX mode of operation, the switch is on and power is transferred from the TX circuit to the antenna, wherein in a RX mode of operation, the switch is off and an RF signal from the antenna is transferred to a RX circuit coupled thereto, a power amplifier circuit adapted to receive a TX RF input signal and generate an RF output signal input to the RF switch, and a low noise amplifier (LNA) adapted to receive an RF input signal from the RF switch and generate an RX RF input signal.

A method of implementing a radio frequency (RF) switch comprising providing an output transformer having a primary and secondary winding, coupling the primary winding to a TX circuit and one end of the secondary winding to an antenna, switching the second end of the secondary winding to ground in accordance with a control signal, turning the switch on in a TX mode of operation whereby power is transferred from the TX circuit to the antenna and turning the switch off in a RX mode of operation whereby an RF signal from the antenna is transferred to a RX circuit coupled thereto.

A mobile device, comprising a radio frequency (RF) transmitter, an RF receiver and an RF front end module (FEM), the FEM comprising an RF switch coupled to one or more antennas and operative to receive and transmit RF signals in one or more frequency bands, the RF switching comprising an output transformer having a primary coil coupled to a TX circuit, and a secondary coil having a first end coupled to an antenna, a switch operative to electrically couple a second end of the secondary coil of the output transformer to ground in accordance with a switch control signal, wherein in a TX mode of operation, the switch is on and power is transferred from the TX circuit to the antenna, wherein in a RX mode of operation, the switch is off and an RF signal from the antenna is transferred to a RX circuit coupled thereto, a power amplifier circuit adapted to receive a TX RF input signal and generate an RF output signal input to the RF switch, and a low noise amplifier (LNA) adapted to receive an RF input signal from the RF switch and generate an RX RF input signal.

BRIEF DESCRIPTION OF THE DRAWINGS

The invention is herein described, by way of example only, with reference to the accompanying drawings, wherein.

DETAILED DESCRIPTION OF THE INVENTION

Modern wireless mobile devices, including for example, DECT, Wi-Fi 802.11 b, g, n, ac, etc. require power amplifiers (PAs) and low noise amplifiers (LNAs) to be high power, high efficiency and highly linear. This typically translates to stringent requirements for RF switches towards insertion loss, linearity and size. Additionally, design of these circuits must take into account the electrostatic discharge (ESD) issue. In particular, these circuits are preferably designed such that the occurrence of ESD will not damage these circuits. Thus, ESD structures are included that damage the performance of the TX/RX switch. As described infra, the TX/RX switch of the present invention overcomes this ESD issue.

Nowadays, an on-chip integrated RF switch requires either two directional transistors, which operate as RF switches, or additional resonant circuits to perform target isolation between TX and RX paths. All the above methods influence either linearity, matching, output power, gain or bandwidth, or all of them together.

Consequently, the existing topologies of the RF switches are not sufficient for switching power due to their poor performance or complicated layout designs.

A novel integrated RF T/R switch enables the design of high power, high efficiency, high bandwidth and high linear power amplifiers. Moreover, the new integrated RF T/R switch allows reducing the area of the front-end/transceiver IC and making the design more robust.

Figure 1:
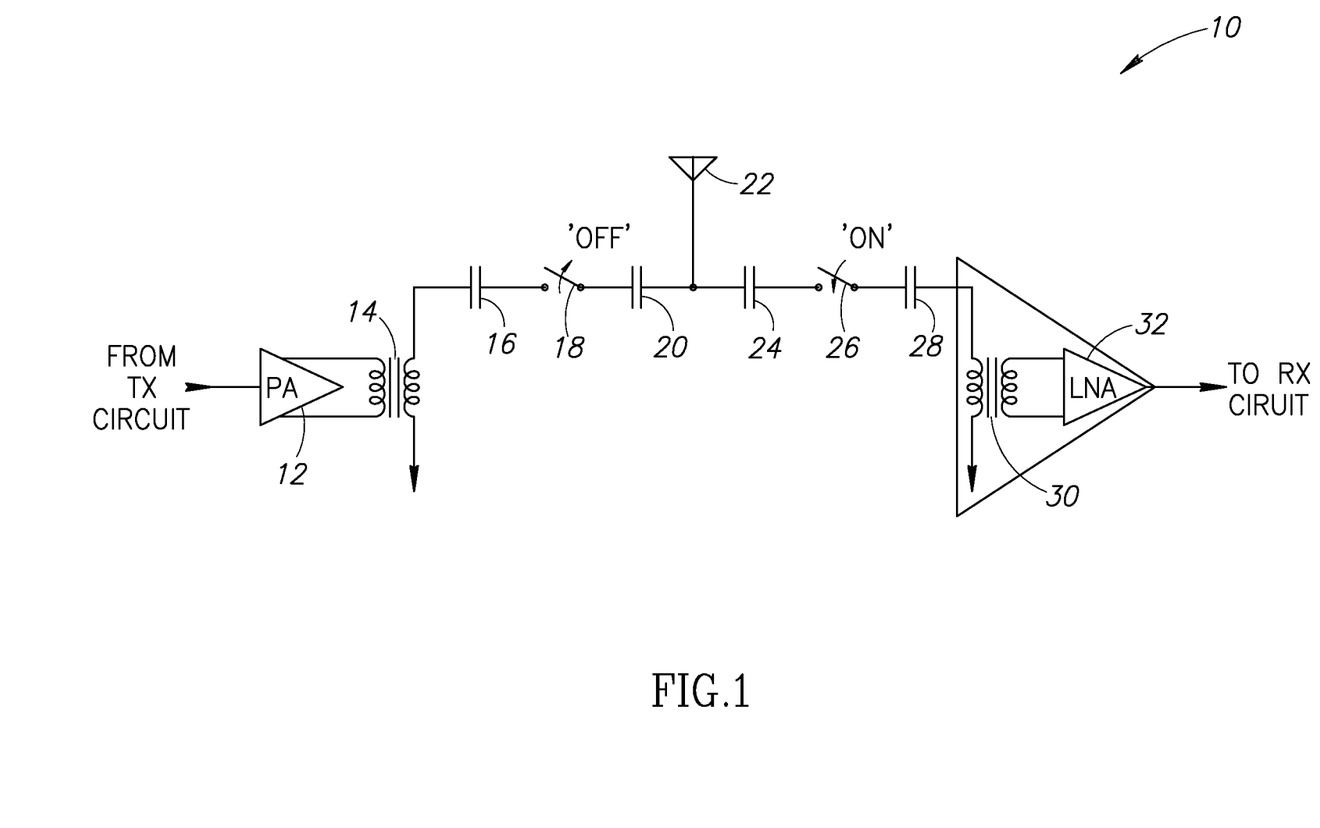
FIG. 1 is a block diagram illustrating a first example TX/RX switch constructed in accordance with a first embodiment of the present invention.

A block diagram illustrating a first example TX/RX switch constructed in accordance with a first embodiment of the present invention is shown in FIG. 1. The TX/RX switch circuit, generally referenced 10, comprises a power amplifier circuit 12 operative to amplify a transmit signal, TX transformer 14 having a primary and secondary winding or coil, antenna 22 connected via an antenna port, switches 18, 26, LNA 32 adapted to amplify a receive signal from the antenna, optional RX transformer 30 having a primary and secondary winding and capacitors 16, 20, 24, 28. During transmit, switch 18 is closed and switch 26 is open, connecting the transmit circuit to the antenna. During receive, switch 18 is open and switch 26 is closed, thus connecting the antenna to the receive circuit.

As shown, this TX/RX switch circuit comprises two series transistors or resonant elements: one in the TX path and one in the RX path. In both modes, there is at least one active transistor in the signal path. The series transistor, however, affects the performance of the switch due to the insertion loss and nonlinearity. Circuit performance, including, linearity, gain, PA efficiency, matching, etc. are effected. In addition, the series transistor affects modeling and simulation.

Note that in one embodiment, the TX transformer is directly connected to the antenna via the antenna port. In other applications, such as cellular, the antenna port may be connected to a bank of one or more front end filters to which one or more antennas are connections.

Figure 2:
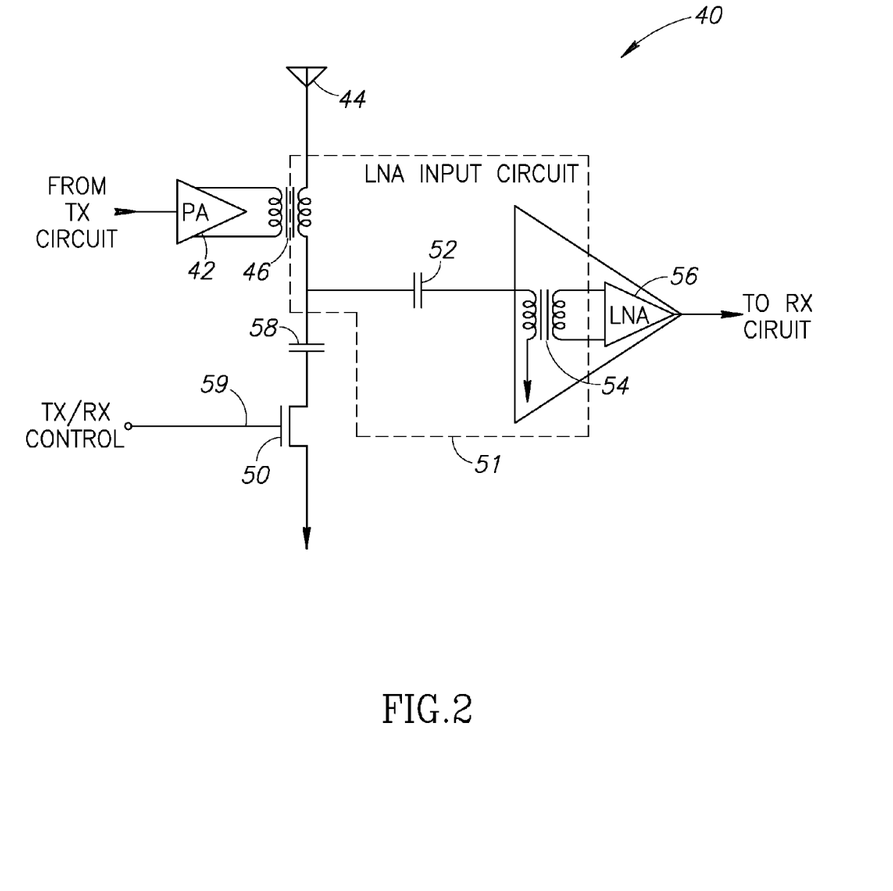
FIG. 2 is a block diagram illustrating a second example TX/RX switch constructed in accordance with a second embodiment of the present invention.

A block diagram illustrating a second example TX/RX switch constructed in accordance with a second embodiment of the present invention is shown in FIG. 2. The TX/RX switch circuit, generally referenced 40, comprises a power amplifier circuit 42 operative to amplify a transmit signal, TX transformer 46 having a primary and secondary winding or coil, antenna 44 connected via an antenna port, switch 50, LNA 56 adapted to amplify a receive signal from the antenna, optional RX transformer 54 having a primary and secondary winding, capacitor 52, and optional ESD capacitor 58.

This second embodiment overcomes the disadvantages of the previous embodiment by eliminating the series switches from the paths of the transmit and receive signals. Typically, the output power of the power amplifier (PA) must be fed to an antenna (i.e. the load) using an output transformer. In this embodiment, the PA output transformer is connected directly to the antenna (i.e. load) without any additional components such as a series transistor switch or additional resonant circuit.

The primary of the output transformer is coupled to the power amplifier while one end of the secondary is coupled to the antenna and the other end is connected to ground via transistor 50. An optional ESD device 58 (e.g., a capacitor) is connected between the secondary of the output transformer 46 and the transistor 50. Capacitor 52 is connected in series with the primary of the input transformer 54 to the LNA 56.

The TX/RX switch includes two modes of operation. In the first mode, the RX mode, the transistor switch 50 is off (via the TX/RX control signal 59). This creates a "floating switching controlled ground" at one end of the secondary of the PA output transformer which is connected to the LNA 56. This creates a path for the RF signal received from the antenna toward the LNA with a minimum of power distribution loss. Moreover, the inductance of the secondary coil of the PA output transformer can replace the required LNA input inductor as part of its input matching network. Thus, the LNA input circuit comprises the secondary of the output transformer 46, capacitor 52 and input transformer 54. Note that in the RX mode of operation, all power amplifier biasing circuits are preferably turned off. This reduces the parasitic capacitance seen by the receiver.

In the second mode, the TX mode, the transistor switch 50 is 'on' (via the TX/RX control signal 59). This enables the connection of the "floating switching controlled ground" of the PA output transformer 46 to the physical IC ground, thereby enabling the operation of the output PA transformer. This transistor is connected on its drain side to the secondary coil of the PA output transformer and to ground on its source side. When this transistor is 'off', a floating ground is created, meaning that the ground is not connected to the input to the LNA as well as the secondary coil of the PA output transformer. When this transistor is 'on', the actual ground is connected to the LNA input and thus no RF input signal appears at the LNA input, thereby establishing the regular functionality of the transformer as part of the PA functionality when in TX operation mode.

Note that the 'on' voltage drop across the switch 50 is negligible due to the intrinsic property of the secondary coil of the transformer whereby the maximum voltage will develop on the antenna side which is the furthest location from GND while the minimum voltage will develop on the ground side of the secondary coil (i.e. on transistor 50). In addition, when transistor 50 is 'on', there is no signal that gets into the LNA input, thus no RF signal gets into the LNA to create stress on its input transistor. Note further that describing the 'on' voltage drop across the transformer 50 as negligible means that the RF voltage developed on the secondary coil is a maximum at the antenna side of the coil while it is a minimum at the transistor side of the coil. The minimum RF voltage does not affect switch transistor functionality even when the PA output is at its maximum power.

Therefore, the TX/RX RF switch circuit is based on the use of an RF transformer which functions as (1) the PA output transformer during TX mode and (2) as a series inductance in an LNA matching network during receive mode. Thus, the RF transformer plays a dual function or role. Such a TX/RX switch is suitable to be integrated into front end module (FEM) circuits, transceiver modules and other RF related modules.

Note that in one embodiment, the LNA can be shutdown to save power. This, however, is not critical since during transmit mode, LNA input is grounded through the TX/RX switch 50. Further the LNA input transform (i.e. input Balun) may be separate or optionally incorporated into the LNA circuit. Further, use of the RX transformer in the LNA is optional as it can be replaced with any suitable input matching circuit and is not critical to the performance of the TX/RX switch of the present invention.

Note that in one embodiment, the TX transformer is directly connected to the antenna via the antenna port. In other applications, such as cellular, the antenna port may be connected to a bank of one or more front end filters to which one or more antennas are connections.

Figure 3:
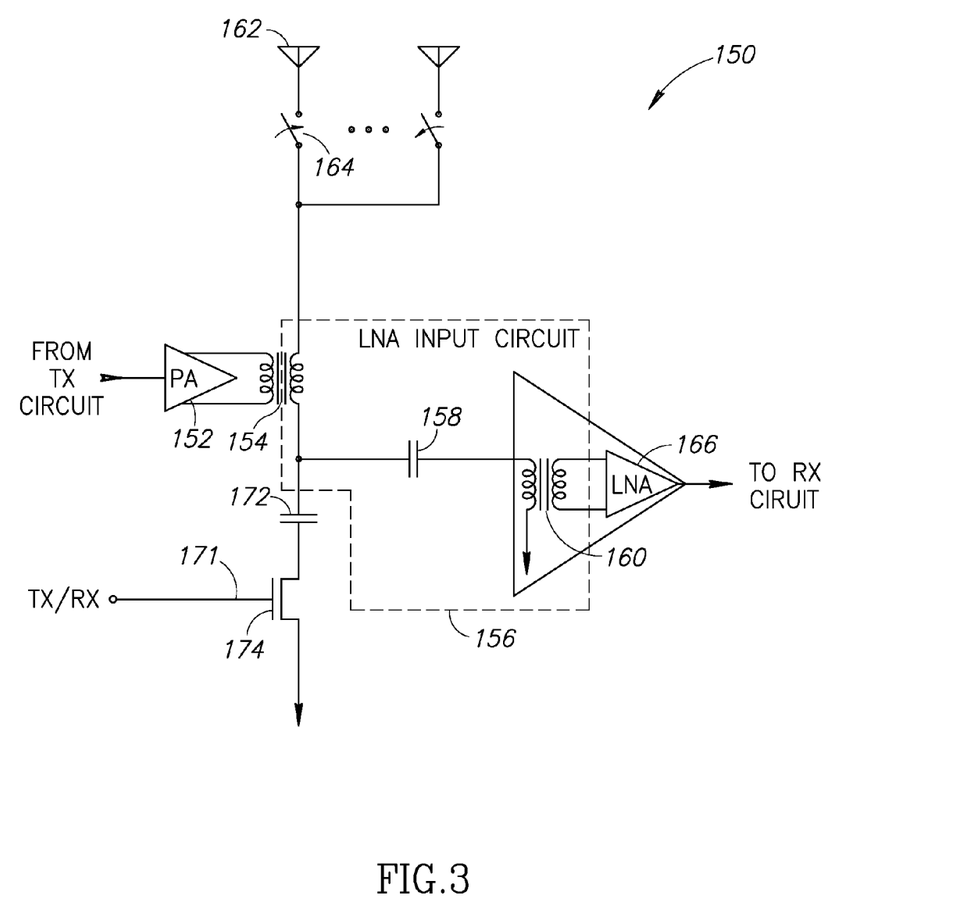
FIG. 3 is a block diagram illustrating a third example TX/RX switch constructed in accordance with a third embodiment of the present invention.

A block diagram illustrating a third example TX/RX switch constructed in accordance with a third embodiment of the present invention is shown in FIG. 3. The construction of this third embodiment is similar to that of the second embodiment with the addition of a plurality of antennas and associated antenna switches. The TX/RX switch circuit, generally referenced 150, comprises a power amplifier circuit 152 operative to amplify a transmit signal, TX transformer 154 having a primary and secondary winding or coil, a plurality of antennas 162 connected via antenna ports and associated RF switches 164, capacitor 158, LNA 166 adapted to amplify a receive signal from the antenna, optional RX transformer 160 having a primary and secondary winding, and optional ESD capacitor 172.

In this embodiment, to achieve antenna diversity, one of the RF switches 164 is closed while the remaining ones are open. In this manner, each antenna can be selectively connected to the transmit or receive circuit in accordance with the appropriate RF switch control signals. The TX/RX switch of the present invention thus uses only one RF switch per antenna in order to implement antenna diversity. Moreover, within the TX/RX switch only one RF switch (i.e. transistor) is used which operates in small signal, thus minimizing the RF losses in the system and provides for robust and simplified matching between the PA, LNA and antennas and improving performance during diversity mode operation. An advantage of the circuit is that in both transmit and receive modes, there is only one series transistor in the signal path regardless of the number of antennas. This minimizes the required real estate, permitting larger dimensions and resulting in a shorter signal path.

Note that in one embodiment, the TX transformer is directly connected to the antennas via the antenna port. In other applications, such as cellular, the antenna port may be connected to a bank of one or more front end filters to which one or more antennas are connections.

Figure 4:
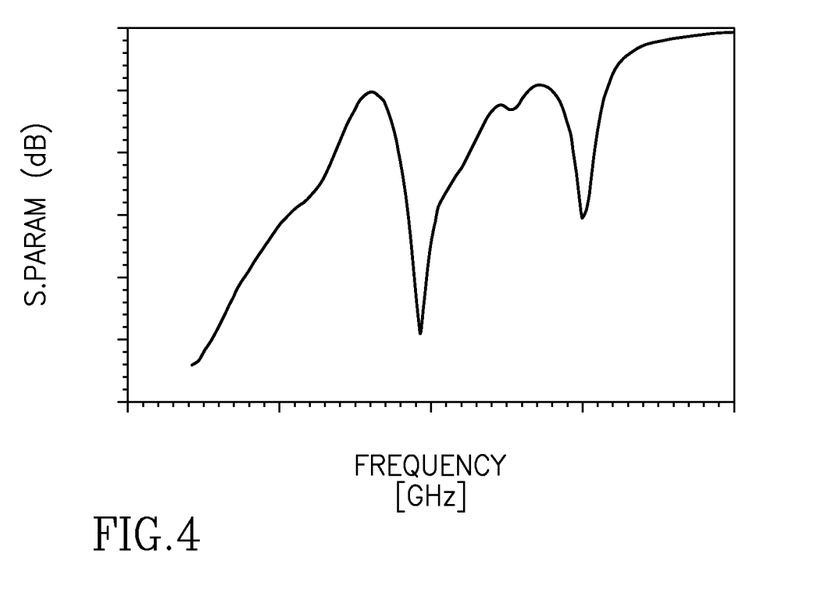
FIG. 4 is a graph illustrating the return loss of the TX/RX switch from the antenna side when in transmit mode.
Figure 5:
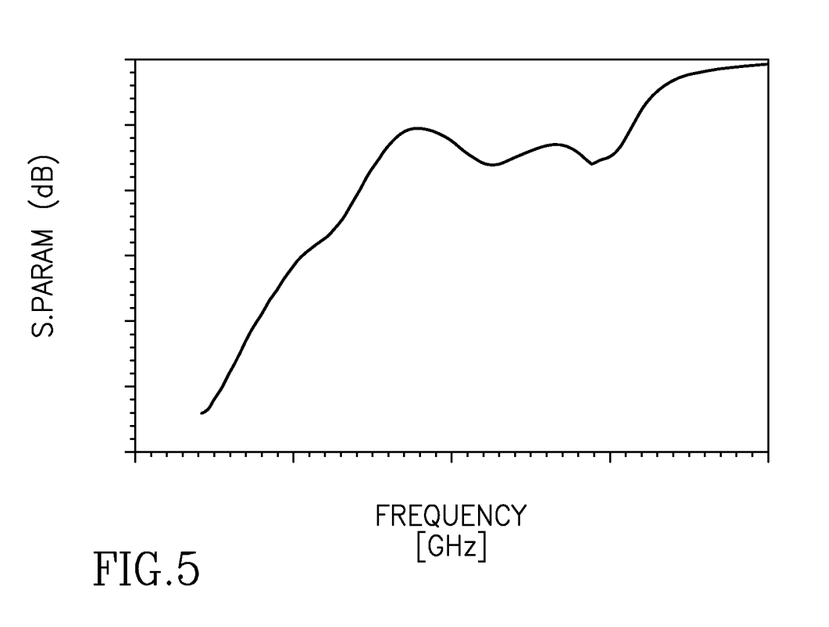
FIG. 5 is a graph illustrating the return loss of the TX/RX switch from the antenna side when in receive mode.

A graph illustrating the return loss of the TX/RX switch looking into the power amplifier from the antenna side when in transmit mode is shown in FIG. 4. A graph illustrating the return loss of the TX/RX switch looking into the power amplifier from the antenna side when in receive mode is shown in FIG. 5. In TX mode, the input power $P_{in}$ was −6.7 dBm and the output power $P_{out}$ at the antenna was 17.5 dBm for a total 24.2 dBm power gain. These graphs represent simulations generated using SpectreRF using an 802.11 ac power amplifier circuit. In RX mode at 4.9 GHz the S11 performance is approximately −20.8 dB; the S22 performance is approximately −11.0 dB; the S21 performance is approximately 14.4 dB; and the S12 performance is approximately −33.2 dB. The noise figure (NF) at 4.9 GHz is approximately 3.5 while the minimum noise figure $NF_{min}$ is 3.32.

As shown in the simulation results, an RF front end based on the second or third TX/RX switch embodiments of the present invention has relatively good performance at the operating frequency band of 5-6 GHz which is the frequency band of the 802.11ac WLAN standard. As described supra, the TX/RX RF switch is implemented as a single transistor as the "ground node" of the PA output transformer, while the input LNA series inductor for input matching purposes is the secondary winding inductor of the PA output transformer.

Figure 6:
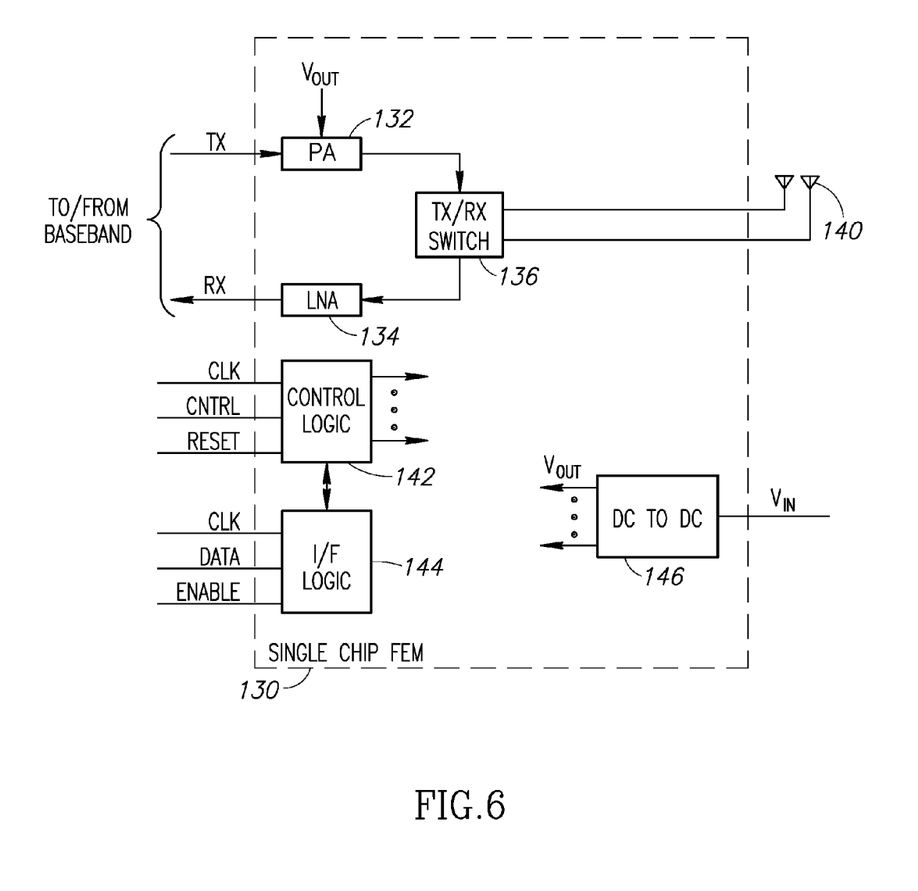
FIG. 6 is a block diagram illustrating an example single chip FEM circuit incorporating the TX/RX switch of the present invention.

A block diagram illustrating an example single chip FEM circuit incorporating the TX/RX switch of the present invention is shown in FIG. 6. The single chip FEM circuit, generally referenced 130, comprises a PA circuit 132 for amplifying a TX signal from the baseband circuit for broadcast through one or more antennas 140, an LNA circuit 134 for amplifying the received signal from one or more of the antennas and output an RX signal for demodulation and decoding by the baseband circuit, a TX/RX switch 136 for coupling either the PA or the LNA to the antenna, TX/RX RF switch 136 for coupling the PA and LNA to the one or more antennas 140, control logic 142, I/F logic 144, optional DC-DC converter circuit 146 and optional envelope tracking generator (not shown).

Multiple antennas 140 may be used in a system employing spatial diversity for example. In a MIMO system, multiple antennas are employed but each antenna has its own associated FEM circuit where the combining of the multiple receive signals and generating of multiple transmit signals is performed via signal processing in the baseband circuit. In this case, each antenna has an associated RF antenna switch. The TX/RX switch circuit 136 is constructed as described supra in connection with the first, second and third embodiments.

Figure 7:
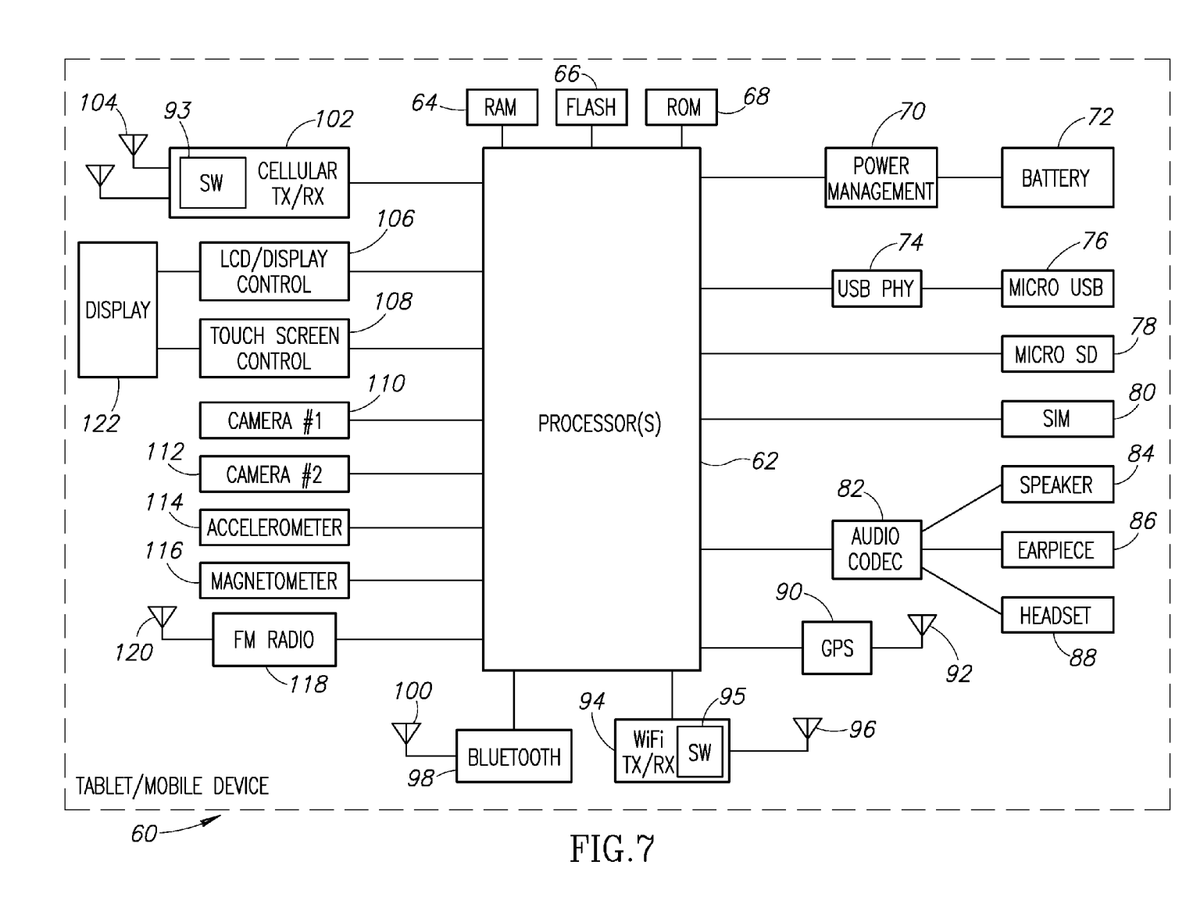
FIG. 7 is a high level block diagram illustrating an example wireless device incorporating the FEM circuit of the present invention.

A high level block diagram illustrating an example wireless device incorporating the FEM circuit of the present invention is shown in FIG. 6. The tablet/mobile device is preferably a two-way communication device having voice and/or data communication capabilities. In addition, the device optionally has the capability to communicate with other computer systems via the Internet. Note that the device may comprise any suitable wired or wireless device such as multimedia player, mobile communication device, cellular phone, cordless phone, smartphone, PDA, PNA, Bluetooth device, tablet computing device such as the iPad, Galaxy, etc. For illustration purposes only, the device is shown as a mobile device, such as a cellular based telephone, cordless phone, smartphone or superphone. Note that this example is not intended to limit the scope of the mechanism as the invention can be implemented in a wide variety of communication devices. It is further appreciated the mobile device shown is intentionally simplified to illustrate only certain components, as the mobile device may comprise other components and subsystems beyond those shown.

The mobile device, generally referenced 60, comprises one or more processors 62 which may comprise a baseband processor, CPU, microprocessor, DSP, etc., optionally having both analog and digital portions. The mobile device may comprise a plurality of radios 102 (e.g., cellular, cordless phone, etc.) coupled to one or more antennae 104. The radios include transmit and receive circuits as well as TX/RX switch circuit 93 constructed in accordance with the present invention. Radios for the wireless link and any number of other wireless standards and Radio Access Technologies (RATs) may be included. Examples include, but are not limited to, Digital Enhanced Cordless Telecommunications (DECT), Code Division Multiple Access (CDMA), Personal Communication Services (PCS), Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; 802.11 WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc.

The mobile device may also comprise internal volatile storage 64 (e.g., RAM) and persistent storage 68 (e.g., ROM) and flash memory 66. Persistent storage 68 also stores applications executable by processor(s) 62 including the related data files used by those applications to allow device 60 to perform its intended functions. Several optional user-interface devices include trackball/thumbwheel which may comprise a depressible thumbwheel/trackball that is used for navigation, selection of menu choices and confirmation of action, keypad/keyboard such as arranged in QWERTY fashion for entering alphanumeric data and a numeric keypad for entering dialing digits and for other controls and inputs (the keyboard may also contain symbol, function and command keys such as a phone send/end key, a menu key and an escape key), headset 88, earpiece 86 and/or speaker 84, microphone(s) and associated audio codec or other multimedia codecs, vibrator for alerting a user, one or more cameras and related circuitry 110, 112, display(s) 122 and associated display controller 106 and touchscreen control 108. Serial ports include a micro USB port 76 and related USB PHY 74 and micro SD port 78. Other interface connections may include SPI, SDIO, PCI, USD, etc. for providing a serial link to a user's PC or other device. SIM/RUIM card 80 provides the interface to a user's SIM or RUIM card for storing user data such as address book entries, user identification, etc.

Portable power is provided by the battery 72 coupled to power management circuitry 70. External power is provided via USB power or an AC/DC adapter connected to the power management circuitry which is operative to manage the charging and discharging of the battery. In addition to a battery and AC/DC external power source, additional optional power sources each with its own power limitations, include: a speaker phone, DC/DC power source, and any bus powered power source (e.g., USB device in bus powered mode).

Operating system software executed by the processor 62 is preferably stored in persistent storage (i.e. ROM 68), or flash memory 66, but may be stored in other types of memory devices. In addition, system software, specific device applications, or parts thereof, may be temporarily loaded into volatile storage 64, such as random access memory (RAM). Communications signals received by the mobile device may also be stored in the RAM.

The processor 62, in addition to its operating system functions, enables execution of software applications on the device 60. A predetermined set of applications that control basic device operations, such as data and voice communications, may be installed during manufacture. Additional applications (or apps) may be downloaded from the Internet and installed in memory for execution on the processor. Alternatively, software may be downloaded via any other suitable protocol, such as SDIO, USB, network server, etc.

Other components of the mobile device include an accelerometer 114 for detecting motion and orientation of the device, magnetometer 116 for detecting the earth's magnetic field, FM radio 118 and antenna 120, Bluetooth radio 98 and antenna 100, 802.11 (including standards 'a', 'b', 'g', 'n', 'ac' for example) based Wi-Fi (WLAN) radio 94 coupled to and one or more antennae 96 (including transmit and receive circuits and TX/RX switch circuit 95 constructed in accordance with the present invention) and GPS 90 and antenna 92.

In accordance with the invention, the mobile device 60 is adapted to implement the electronic catalog system as hardware, software or as a combination of hardware and software. In one embodiment, implemented as a software task, the program code operative to implement the electronic catalog system is executed as one or more tasks running on processor 62 and either (1) stored in one or more memories 64, 66, 68 or (2) stored in local memory within the processor 62 itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An integrated transmit/receive (TX/RX) radio frequency (RF) switch, comprising:
   an output transformer having a primary coil coupled to a transmit (TX) circuit, and a secondary coil having a first end coupled to an antenna;
   a switch operative to electrically couple a second end of said secondary coil of said output transformer to ground in accordance with a switch control signal;
   wherein in a TX mode of operation, said switch is on and power is transferred from said TX circuit to said antenna; and
   wherein in a receive (RX) mode of operation, said switch is off and an RF signal from said antenna is transferred to a RX circuit coupled thereto.

2. The integrated TX/RX RF switch according to claim 1, wherein said secondary coil functions as a power amplifier output transformer as well as a series inductance as part of an low noise amplifier (LNA) input matching network.

3. The integrated TX/RX RF switch according to claim 1, wherein during said RX mode of operation, TX power amplifier biasing circuits are turned off.

4. The integrated TX/RX RF switch according to claim 1, wherein during said RX mode of operation, a floating switching controlled ground of said secondary coil of said output transformer is electrically connected to an input of an LNA circuit.

5. The integrated TX/RX RF switch according to claim 1, wherein during said TX mode of operation, said secondary coil of said output transformer is electrically coupled to ground.

6. The integrated TX/RX RF switch according to claim 1, wherein said output transformer comprises an integrated semiconductor transformer.

7. The integrated TX/RX RF switch according to claim 1, wherein the on voltage drop of said switch is minimized such that the impedance of an low noise amplifier (LNA) Balun in parallel with said switch is substantially negligible.

8. The integrated TX/RX RF switch according to claim 1, wherein a low noise amplifier (LNA) circuit coupled to said switch is turned off during said TX mode of operation to reduce power consumption.

9. The integrated TX/RX RF switch according to claim 1, wherein a low noise amplifier (LNA) circuit coupled to said switch remains on during said TX mode of operation without suffering substantial damage.

10. The integrated TX/RX RF switch according to claim 1, further comprising an electrostatic discharge (ESD) protection capacitor coupled between said switch and said second end of said secondary coil of said output transformer.

11. An integrated transmit/receive (TX/RX) radio frequency (RF) switch, comprising:
   an output transformer having a primary coil coupled to a transmit (TX) circuit and a secondary coil having a first end and a second end;
   a plurality of antennas;
   a plurality of antenna switches, each switch in series with a respective antenna and coupled to the first end of said secondary coil of said output transformer;
   a TX/RX switch operative to electrically couple the second end of said secondary coil of said output transformer to ground in accordance with a switch control signal;
   wherein in a TX mode of operation, said switch is on and power is transferred from said TX circuit to one or more of said antennas; and
   wherein in a receive (RX) mode of operation, said switch is off and an RF signal from one or more of said antennas is transferred to an RX circuit coupled thereto.

12. The integrated TX/RX RF switch according to claim 11, wherein antenna diversity is achieved requiring N+1 active transistor switches, where N is the number of antennas.

13. The integrated TX/RX RF switch according to claim 11, wherein said secondary coil functions as a power amplifier output transformer as well as a series inductance as part of an LNA input matching network.

14. The integrated TX/RX RF switch according to claim 11, wherein during said RX mode of operation, TX power amplifier biasing circuits are turned off.

15. The integrated TX/RX RF switch according to claim 11, wherein during said RX mode of operation, a floating switching controlled ground of said secondary coil of said output transformer is electrically connected to an input of an LNA circuit.

16. The integrated TX/RX RF switch according to claim 11, wherein during said TX mode of operation, said secondary coil of said output transformer is electrically coupled to ground.

17. The integrated TX/RX RF switch according to claim 11, wherein said output transformer comprises an integrated semiconductor transformer.

18. The integrated TX/RX RF switch according to claim 11, wherein the on voltage drop of said switch is minimized such that the impedance of an LNA Balun in parallel with said switch is substantially negligible.

19. The integrated TX/RX RF switch according to claim 11, wherein an LNA circuit coupled to said switch is turned off during said TX mode of operation to reduce power consumption.

20. The integrated TX/RX RF switch according to claim 11, wherein a low noise amplifier (LNA) circuit coupled to said switch remains on during said TX mode of operation without suffering damage.

21. The integrated TX/RX RF switch according to claim 11, further comprising an electrostatic discharge (ESD) protection capacitor coupled between said switch and said second end of said secondary coil of said output transformer.

22. A radio frequency (RF) front end module (FEM), comprising:
   an RF switch coupled to one or more antennas and operative to receive and transmit RF signals in one or more frequency bands, said RF switch comprising:
      an output transformer having a primary coil coupled to a transmit (TX) circuit, and a secondary coil having a first end coupled to an antenna;
      a switch operative to electrically couple a second end of said secondary coil of said output transformer to ground in accordance with a switch control signal;
      wherein in a TX mode of operation, said switch is on and power is transferred from said TX circuit to said antenna;
      wherein in a receive (RX) mode of operation, said switch is off and an RF signal from said antenna is transferred to a RX circuit coupled thereto;
   a power amplifier circuit adapted to receive a TX RF input signal and generate an RF output signal input to said RF switch; and
   a low noise amplifier (LNA) adapted to receive an RF input signal from said RF switch and generate an RX RF input signal.

23. The RF FEM according to claim 22, wherein said secondary coil functions as a power amplifier output transformer as well as a series inductance as part of a low noise amplifier (LNA) input matching network.

24. The RF FEM according to claim 22, wherein during said RX mode of operation, TX power amplifier biasing circuits are turned off.

25. The RF FEM according to claim 22, wherein during said RX mode of operation, a floating switching controlled ground of said secondary coil of said output transformer is electrically connected to an input of a low noise amplifier (LNA) circuit.

26. A method of implementing a radio frequency (RF) switch, comprising:
   providing an output transformer having a primary and secondary winding;
   coupling said primary winding to a transmit (TX) circuit and one end of said secondary winding to an antenna;
   switching said second end of said secondary winding to ground in accordance with a control signal;
   turning said switch on in a TX mode of operation whereby power is transferred from said TX circuit to said antenna; and
   turning said switch off in a receive (RX) mode of operation whereby an RF signal from said antenna is transferred to a RX circuit coupled thereto.

27. The method according to claim 26, wherein said secondary coil functions as a power amplifier output transformer as well as a series inductance as part of an low noise amplifier (LNA) input matching network.

28. A mobile device, comprising:
   a radio frequency (RF) transmitter;
   an RF receiver; and
   an RF front end module (FEM), said FEM comprising:
      an RF switch coupled to one or more antennas and operative to receive and transmit RF signals in one or more frequency bands, said RF switch comprising:
         an output transformer having a primary coil coupled to a transmit (TX) circuit, and a secondary coil having a first end coupled to an antenna;
         a switch operative to electrically couple a second end of said secondary coil of said output transformer to ground in accordance with a switch control signal;

wherein in a TX mode of operation, said switch is on and power is transferred from said TX circuit to said antenna;

wherein in a receive (RX) mode of operation, said switch is off and an RF signal from said antenna is transferred to a RX circuit coupled thereto;

a power amplifier circuit adapted to receive a TX RF input signal and generate an RF output signal input to said RF switch; and a low noise amplifier (LNA) adapted to receive an RF input signal from said RF switch and generate an RX RF input signal.

29. The mobile device according to claim 28, wherein said secondary coil functions as a power amplifier output transformer as well as a series inductance as part of an LNA input matching network.

30. The integrated TX/RX RF switch according to claim 1 wherein the switch that is operative to electrically couple the second end of said secondary coil of said output transformer to ground in accordance with the switch control signal is the only switch of the integrated TX/RX RF switch.

31. The integrated TX/RX RF switch according to claim 1 wherein the switch that is operative to electrically couple the second end of said secondary coil of said output transformer to ground in accordance with the switch control signal is the only switch that is coupled to the secondary coil of said output transformer.

* * * * *